United States Patent
Meek et al.

(10) Patent No.: US 6,366,927 B1
(45) Date of Patent: Apr. 2, 2002

(54) METHOD AND SYSTEM FOR REPRESENTATION AND USE OF SHAPE INFORMATION IN GEOGRAPHIC DATABASES

(75) Inventors: James A. Meek, Palatine, IL (US); Richard A. Ashby, Blue River, WI (US); David S. Lampert, Highland Park, IL (US)

(73) Assignee: Navigation Technologies Corp., Chicago, IL (US)

( * ) Notice: Subject to any disclaimer, the term of this patent is extended or adjusted under 35 U.S.C. 154(b) by 0 days.

(21) Appl. No.: 09/460,454

(22) Filed: Dec. 13, 1999

Related U.S. Application Data (63) Continuation of application No. 08/979,211, filed on Nov. 26, 1997, now Pat. No. 6,029,173.

(51) Int. Cl.[7] ............................................... G06F 17/30
(52) U.S. Cl. .................... 707/104.1; 707/102; 701/200; 345/442
(58) Field of Search .............................. 707/100–104.1; 701/200–203, 208–212; 345/643–645, 441–443

(56) References Cited

U.S. PATENT DOCUMENTS

| | | | |
|---|---|---|---|
| 5,438,517 A | 8/1995 | Sennott et al. ............... 701/213 |
| 5,469,513 A | * 11/1995 | Kurumida .................... 382/203 |
| 5,470,233 A | 11/1995 | Fruchterman et al. ....... 434/112 |
| 5,497,451 A | 3/1996 | Homes ........................ 345/420 |
| 5,524,202 A | * 6/1996 | Yokohama .................. 707/104.1 |
| 5,566,288 A | 10/1996 | Koerhsen ..................... 395/142 |
| 5,717,905 A | * 2/1998 | Iwamoto et al. ................ 703/1 |
| 5,740,275 A | * 4/1998 | Yoshida ....................... 382/197 |

FOREIGN PATENT DOCUMENTS

| | | | |
|---|---|---|---|
| EP | 0 394 517 A1 | | 10/1990 |
| EP | 447126 A2 | * | 9/1991 |
| EP | 447176 A2 | * | 9/1991 |
| EP | 0 807 803 A2 | | 11/1997 |
| EP | 919788 A1 | * | 6/1999 |
| JP | 11265441 | * | 9/1999 |
| WO | WO 95/32483 | | 11/1995 |

* cited by examiner

*Primary Examiner*—Maria N. Von Buhr
(74) *Attorney, Agent, or Firm*—Frank J. Kozak; Lawrence M. Kaplan (57) ABSTRACT

A system and method for storing data to represent other-than-straight map features in a computer-readable geographic database for use in a navigation system. For geographic features that are other-than-straight, a curve generated by a computable function is fitted to an image of the other-than-straight map feature. The computable function may be a polynomial equation whose shape is defined by its coefficients. In one embodiment, the polynomial equation is a type of spline curve, in particular a Bezier curve whose shape is defined by control points. The coefficients of the polynomial equation are associated with data representing the other-than-straight feature. In the case in which the polynomial equation is a Bezier curve, the control points for generating the Bezier curve are associated with the data representing the other-than-straight feature. These control points are stored in the geographic database and are used in displaying the other-than-straight geographic feature. Use of a computable function to generate other-than-straight geographic features and storing parameters to be used by the computable function has the potential for significantly reducing the storage requirements for representing other-than-straight features in a geographic database. According to a further aspect, normalized control point pairs are stored in a data structure and an index reference into the data structure is associated with data used to represent the other-than-straight geographic features, thereby resulting in further reduction in data storage requirements.

20 Claims, 6 Drawing Sheets

FIG.8
(1ST METHOD)

FIG.9
(2ND METHOD)

METHOD AND SYSTEM FOR REPRESENTATION AND USE OF SHAPE INFORMATION IN GEOGRAPHIC DATABASES

REFERENCE TO RELATED APPLICATION

The present application is a continuation of Ser. No. 08/979,211, filed Nov. 26, 1997 now issued as U.S. Pat. No. 6,029173.

BACKGROUND OF THE INVENTION

The present invention relates to navigation systems and in particular to geographic data sets for use in navigation systems.

Computer-based navigation systems for use on land have become available in a variety of forms and provide for a variety of useful features. One exemplary type of navigation system uses (1) one or more detailed data sets that represent one or more geographic areas or regions, (2) a navigation application program, (3) appropriate computer hardware, such as a microprocessor, memory, and data storage, and, optionally, (4) a positioning system.

Figure 1:
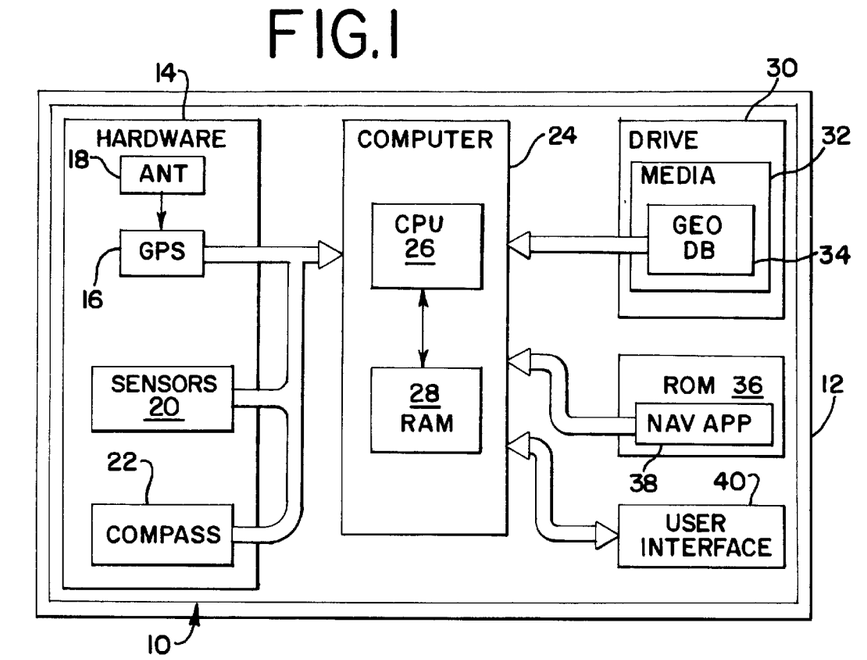
FIG. 1 is a block diagram of a conventional navigation system.

Referring to FIG. 1, there is a diagram illustrating a configuration of an exemplary navigation system 10. The navigation system 10 is a combination of hardware and software components which can be implemented in various different kinds of environments or on different platforms. For example, the navigation system 10 may be located in an automobile 12. In an exemplary embodiment, the navigation system 10 includes appropriate hardware 14 which may include a GPS system 16, an antenna 18, sensors 20 coupled to sense the vehicle speed and distance traveled, and a compass 22 to sense the vehicle direction. In addition, the navigation system includes an appropriate computer 24, including a CPU 26 and memory 28 as well as other appropriate hardware.

Included as part of the navigation system 10 is a drive 30 (or other suitable peripheral device) into which a data storage medium 32 can be installed. One or more geographic data sets 34 are stored on the storage medium 32. In one embodiment, the storage medium 32 is a CD-ROM disc. In another alternative embodiment, the storage medium 32 may be a PCMCIA card in which case the drive 30 would be substituted with a PCMCIA slot. Various other storage media may be used, including fixed or hard disks, DVD (digital video disks) or other currently available storage media, as well as storage media that may be developed in the future. The embodiments disclosed herein may be used in other types of navigation systems, as explained below.

The navigation system 10 also includes a user interface 40 coupled to the computer 24. The user interface 40 includes appropriate means for receiving instructions and input from an end-user as well as means for providing information back to the end-user. For example, the user interface 40 may include an input panel or keyboard into which an end-user may indicate a selection of a destination. The user interface 40 may also include a display or speakers (including speech synthesis hardware and software) by which the user can be informed of navigation information. For visual navigation information, the user interface 40 may provide features allowing the user to zoom a display in on or out of a particular geographic area to alternately display a larger geographic area or more detailed geographic information.

The positioning system may employ any of several well-known technologies to determine or approximate the end-user's physical locations in a geographic region. For example, the positioning system may employ a GPS-type system (global positioning system), a dead reckoning-type system, or combinations of these, or other systems, all of which are well-known in the art.

All of the components described above may be conventional (or other than conventional) and the manufacture and use of these components are known to those of skill in the art.

The navigation system 10 includes another data storage device 36 (or ROM) which is used to store a navigation application program 38. (Alternatively, the application program 38 may be provided on the same storage device or medium 32 as the geographic data sets 34.) The navigation application program 38 is a software program that uses the geographic data set 34 and the positioning system (when employed). The navigation application program 38 may include separate applications (or subprograms). These subprograms provide various navigation features to the end-user of the navigation system 10. These features may include route calculation functions, maneuver generation functions, map display functions, vehicle positioning functions, destination resolution capabilities, and so on. The navigation features are provided to the end-user (e.g., the vehicle driver) by means of the user interface 40. The navigation application program 38 may be written in a suitable computer programming language such as C, although other programming languages are also suitable.

During a typical usage of the navigation system 10 of FIG. 1, the navigation application program 38 is loaded from the ROM 36 into the memory 28 associated with the processor 26. The computer 24 receives input from the user interface 40. The input may include a request for navigation information. The computer 24 receives information from the positioning system hardware 14. The information from the hardware 14 is used by the navigation application software 38 to determine the location, direction, speed, etc., of the vehicle 12. The navigation application program 38 may provide the end-user with a graphical display (e.g. a "map") of the end-user's specific location in the geographic region. In addition, the navigation application program may provide the end-user with specific directions to locations in the geographic area from wherever the end-user is located.

To provide these various navigation application features, the navigation system 10 uses the geographic data 34 stored on the storage medium 32, optionally in conjunction with the output from the positioning system hardware 14. The geographic data 34 may be in the form of one or more computer-readable files or databases that enable the navigation application program 38 to provide the supported features. For example, to enable the calculation of a route between two locations in the geographic region, the geographic data 34 may include route calculation data that includes the positions of roads and intersections in the geographic region, information about one-way streets, turn restrictions, stop signs, stop lights, speed limits, and so on.

When performing a map display function with the navigation system, the sizes, shapes, and relative positions of geographic features in a portion of a geographic region are portrayed on the display of the user interface 40. These geographic features may include roads, intersections, and points-of-interest, as well as other features, such as lakes, railroad tracks, buildings, airports, stadiums, parks, mountain ranges, docks, ferries, tunnels, bridges, and so on. To provide this map display function, the geographic data set 34 may include cartographic data which allows the navigation application program 38 to display maps illustrating the size, shape, position, and character of these various geographic features on an attached display device. Zooming and panning of the displayed areas may also be supported.

Figure 2:
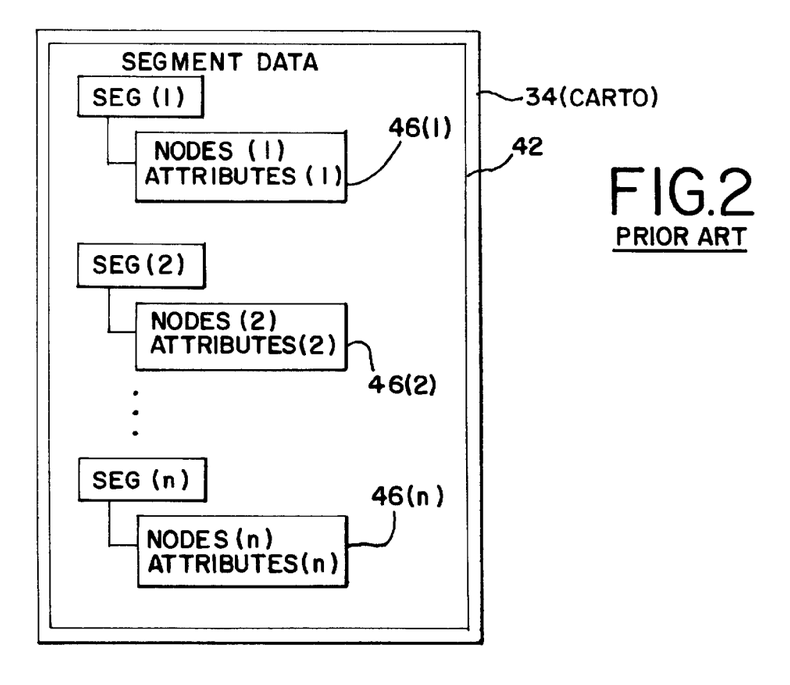
FIG. 2 is a block diagram representing a part of the geographic database illustrated in FIG. 1

Referring to FIG. 2, there is a diagram illustrating an exemplary configuration of a cartographic data set 34(carto) used for map display. The data set 34(carto) is part of the geographic data set 34 of FIG. 1 which may include other kinds of data sets used for route calculation, maneuver generation, and other navigation functions. In FIG. 2, the data set 34(carto) includes a (sub)set 42 of road segment data entities, e.g. seg(1), seg(2) . . . seg(n). Each road segment data entity represents a portion of a roadway in the geographic region. Associated with each road segment data entity record, seg( ), are data (such as nodes and attributes 46(1), 46(2) . . . 46(n)) that facilitate portraying the respective represented road portions on the computer display device. The road segment data entities, seg(1), seg(2) . . . seg(n), may be implemented using standard types of data structures used in database construction.

Figure 3:
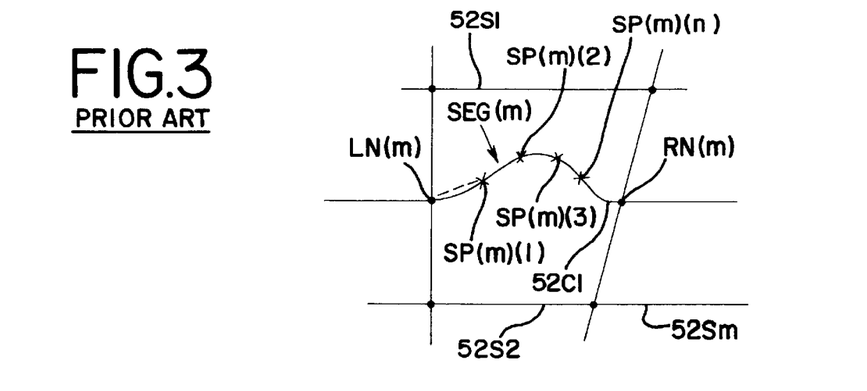
FIG. 3 is a representation of a map illustrating a portion of the geographic region represented by the geographic database of FIG. 2

Referring to FIG. 3, there is a map diagram illustrating a portion of the geographic region represented by the geographic data set 34. This portion shows roadways of both straight, 52S1, 52S2, and other-than-straight (e.g. curved), 52C1, types. For purposes of storing the necessary information to display this portion of the geographic region, nodes are identified along the roadways. Nodes are identified where two roads intersect or where any of the attributes associated with a portion of the road change, such as when a road enters a school zone and the speed limit changes. In the data set 34, each of the road segment entity records is associated with the two nodes (and/or the geographical coordinates of the nodes) that correspond to the locations of the end points of the road portion represented by the road segment entity record, as illustrated at 46( ) in FIG. 2. Also associated with the road segment entity record in the cartographic data set 34(carto) is other information necessary to portray the road portion, as also illustrated at 46( ) in FIG. 2.

For straight road portions, e.g. 52S1, 52S2 in FIG. 3, portraying the shape of a road portion can be done by generating a straight line linking the end points (i.e., nodes) identified by the segment data entity record that represents the road portion. However, when the road portion is other-than-straight, it is required that the geographic database include additional information to display the shape of the road portion.

Figures 4, 5:
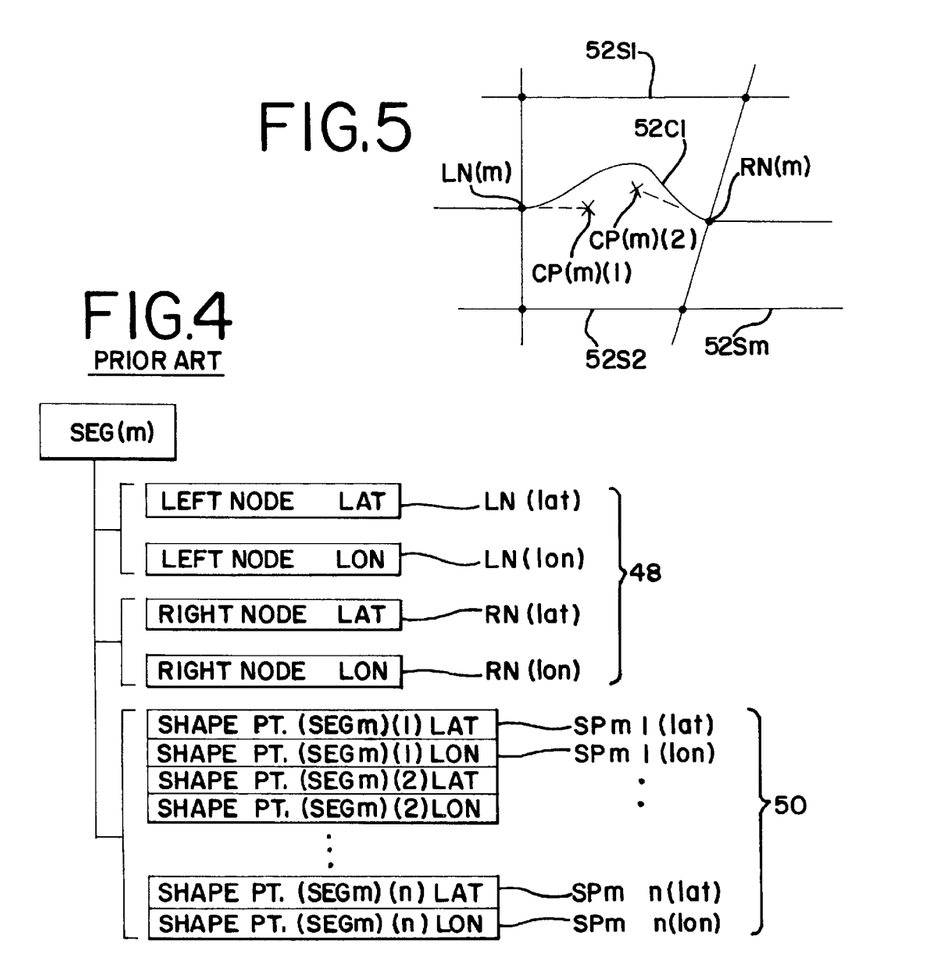
FIG. 4 is a block diagram illustrating parts of a road segment record in the geographic database of FIG. 2 according to a prior art method.
FIG. 5 is a representation of a map illustrating a portion of the geographic region and illustrating application of a first embodiment of the invention.

In the map of FIG. 3, there is shown the curved road portion 52C1 represented by seg(m) which has end points, represented by LN(m) and RN(m). FIG. 4 shows a diagram of a road segment data record, seg(m) in the data set 34(carto) used to represent the curved road portion 52C1 in FIG. 3. Associated with the road segment data entity seg(m) are node data 48 that include the latitude and longitude coordinate positions of the two end points, LN(m) and RN(m) of the represented road portion 52C1. In one known geographic database for a navigation system, curving geographic features are represented using shape points. FIG. 3 shows exemplary shape points SP(m)(1), SP(m)(2), SP(m)(3), and SP(m)(n) located along the portion of the road 52C1 represented by the data entity seg(m). Using this method, in addition to the node data, the geographic data set 34 also stores data corresponding to these shape points that fall along the curving geographic feature. In FIG. 4, the road segment data entity seg(m) is associated with shape points 50 (SP(m)(1), SP(m)(2) . . . SP(m)(n)) which store latitude and longitude coordinates for each of the shape points located along the curved road portion 52C1. These shape points are used for several purposes in the geographic database and by the navigation application that uses it. For example, shape points are used to approximate the curving shape of the represented portion of the road on the computer display. The curving geographic feature is reproduced on the display by drawing straight lines from shape point to shape point starting and ending with the end points. The number of shape points stored between a given set of end points depends on the shape of the curve and the accuracy or resolution desired in the reproduced display. Shape points are also used by the navigation application for vehicle positioning along curved road portions, where accuracy is important. (Although the terminology "shape point" is used in this specification, it is understood that other terminology could be used to refer to a position or locus along a straight or curving geographic feature.)

The description provided above relates to the portrayal of other-than-straight portions of roadways. Similar considerations apply to the portrayal of other geographic features in the form of lines or polygons, such as ponds, railroad tracks, buildings, airports, stadiums, parks, mountain ranges, docks, ferries, tunnels, bridges, and so on. Shape points are selected along the lengths or boundaries of these kinds of geographic features, stored, and used to portray the feature on a computer display.

While using shape points to represent the shape of an other-than-straight geographic feature has the advantage that it is conceptually relatively simple to work with in database development, compilation, access and display software, it has several drawbacks. Storing these additional data for displaying other-than-straight geographic features increases the data storage requirements of the geographic data sets. Even with modest accuracy requirements, five to ten percent of each database may be dedicated to shape point data. Moreover, this percentage increases in direct proportion to any increase in accuracy requirements. Further, since shape information represents a much larger percentage of those geographic data subsets used for map display and to infer the vehicle's position, the negative impact on RAM memory size requirements and database read time is proportionately even greater.

Accordingly, there is a need in navigation systems to provide a method of representing and storing geographic feature information in such a way as to minimize the storage requirements while providing a high level of accuracy in the representation of other-than-straight features. Further, it is desired that the increases in resolution and accuracy in a geographic data set do not negatively impact on RAM memory size or operating performance requirements of a navigation system.

Therefore, it is an objective to provide an improved method for representing and storing geographic feature information that provides for highly accurate representation of geographic features, minimal storage requirements and minimal impact on hardware configuration requirements.

SUMMARY OF THE INVENTION

To achieve the foregoing and other objectives and in accordance with the purposes of the present invention, there is provided a system and method for storing data to represent other-than-straight map features in a computer-readable geographic database for use in a navigation system. For geographic features that are other-than-straight, a curve generated by a computable function is fitted to an image of the other-than-straight map feature. The computable function may be a polynomial equation whose shape is defined by its coefficients. In one embodiment, the polynomial equation is a spline curve, and in particular a Bezier curve whose shape is defined by control points. The coefficients of the polynomial equation are associated with data representing the other-than-straight feature. In the case in which the polynomial equation is a Bezier curve, the control points for generating the Bezier curve are associated with the data representing the other-than-straight feature. These control points are stored in the geographic database and are used in displaying the other-than-straight geographic feature. Use of a computable function to generate other-than-straight geographic features and storing parameters to be used by the computable function has the potential for significantly reducing the storage requirements for representing other-than-straight features in a geographic database.

According to a further aspect, normalized control point pairs are stored in a data structure and an index reference into the data structure is associated with data used to represent the other-than-straight geographic feature, thereby resulting in further reduction in data storage requirements.

DETAILED DESCRIPTION OF THE PRESENTLY PREFERRED EMBODIMENTS

I. First Embodiment

Referring to FIG. 5, there is shown the same geographic region and roadways as shown in FIG. 3 with straight road portions 52S1, 52S2, and the other-than-straight road portion 52C1. As mentioned in connection with the embodiment of FIGS. 3 and 4, nodes are selected and define the end points of the roadway portions and are established where two or more roadways intersect or where the attributes of a roadway change. In the geographic database, these node data points divide up the roadways and mark the end points of the road portions to be represented as road segment data entities. In the geographic database of this embodiment, straight roadway portions are represented by road segment entities which are associated with the coordinate positions of the end points (e.g. nodes) of the represented road portion.

In addition to data that identify the coordinates of their end points, the other-than-straight roadway portions are represented using the locations of two (or more) parameters. These parameters are used by a computable function to generate the shape of the other-than-straight geographic feature. In the embodiment shown, the computable function is a Bezier curve and the parameters that are stored are control points for generating the Bezier curve. FIG. 5 shows control points $CP(m)(1)$ and $CP(m)(2)$ which, as will be discussed later, are used in the representation of the shape of the other-than-straight road portion 52C1 in the geographic database. These control points are determined by using Bezier curves, a subset of the cubic spline subfamily of spline curves. In alternative embodiments, other polynomial equations defining curved vectors, including other spline curve families, may be used.

With spline curves, and in particular, Bezier curves, other-than-straight map features, such as curving road portions, are represented by polynomial equations whose coefficients have been determined so as to generate curves that match the shapes of the geographic features with the desired degree of accuracy.

A property of Bezier curves is that they are defined by their two end points and two additional control points. These control points are positioned along the tangents to the curve at the end points, as illustrated by the dashed lines in FIG. 5. Bezier curves can closely approximate S-curves, circular arcs, parabolic shapes and even straight lines. Standard techniques for fitting polynomial curves to point series can be employed to find the control point coordinates that give a best-fit Bezier curve for any particular series of shape points used in a straight-line-segment approximation to a curve in a geographic database.

In the first embodiment of a geographic database, control points are associated with the road segment data entity that represents the other-than-straight portion of the road. In one embodiment, these control points, $CP(1)(m)$ and $CP(2)(m)$, or their latitude and longitude coordinates, are associated with the segment entity, $seg(m)$. In one embodiment, these control point data are stored as attributes of the segment data entity.

Figure 6:
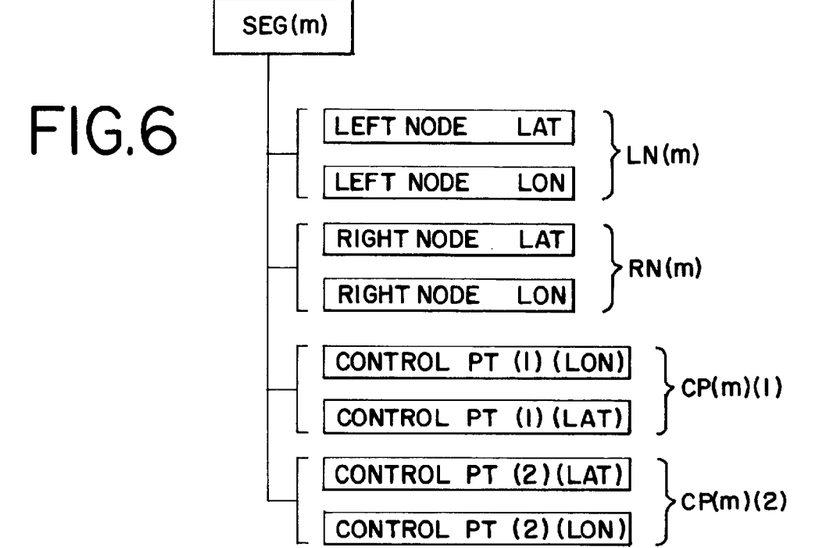
FIG. 6 is a block diagram illustrating parts of a road segment record in the geographic database according to a first embodiment.

FIG. 6 shows a diagram of the road segment data entity $seg(m)$ which represents the curved road portion 52C1 of FIG. 5. The segment entity is associated with data which are used to portray the road portion. The data include node data, $LN(m)$, $RN(m)$, which identify the latitude and longitude coordinate positions of the road portion's corresponding end points, and control point data, $CP(m)(1)$, $CP(m)(2)$, which identify the latitude and longitude coordinate positions of the two control points which can be used to represent the shape of the curved road portion 52C1.

Figure 7:
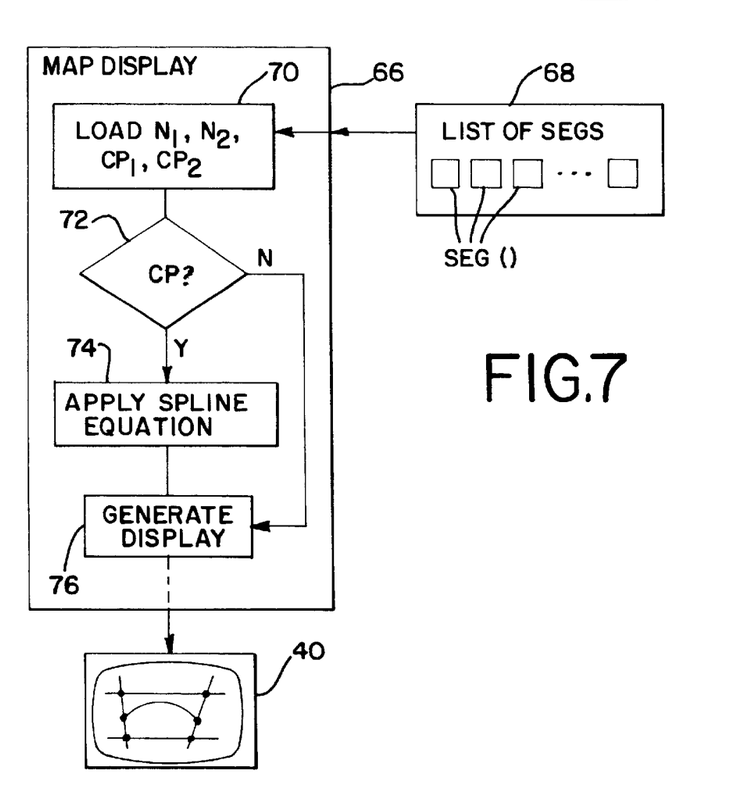
FIG. 7 is a block diagram of a display portion of the navigation application program of FIG. 1 modified to use the geographic database having segment records as in FIG. 6.

Using the first embodiment of the geographic database. FIG. 7 shows the steps that an embodiment of a map display program 66 performs to display part of the geographic region represented by an embodiment of the geographic database that uses control point data, as in FIG. 6, to portray curved features. The map display program 66 is part of the navigation application program 38 in FIG. 1. First, the map display program 66 receives a list 68 of road segment data entities, seg( ), which represent the road portions to be displayed. Steps 70–76 are repeated for each road segment data entity in the list 68. In Step 70, the map display program 66 reads the data associated with each segment entity record. These data include the geographic coordinates of the nodes associated with the segment data entity. (The node data contain the end point locations for the particular road portion to be displayed.) Step 72 checks for the existence of control points associated with the segment entity. If the segment data entity has no control points associated with it, Step 72 skips to Step 76 at which the road segment is portrayed drawing a straight line between the end points on the display of the user interface 40. However, if there are control points associated with the segment record, Step 72 passes the data associated with the segment to Step 74. At Step 74, the Bezier curve is calculated using the appropriate polynomial equation and the image of the curve is generated. Also in Step 76, the generated image of the curve is output to the display of the user interface 40. These steps are repeated until all the road portions represented in the list 68 are rendered on the display of the user interface 40.

Figure 8:
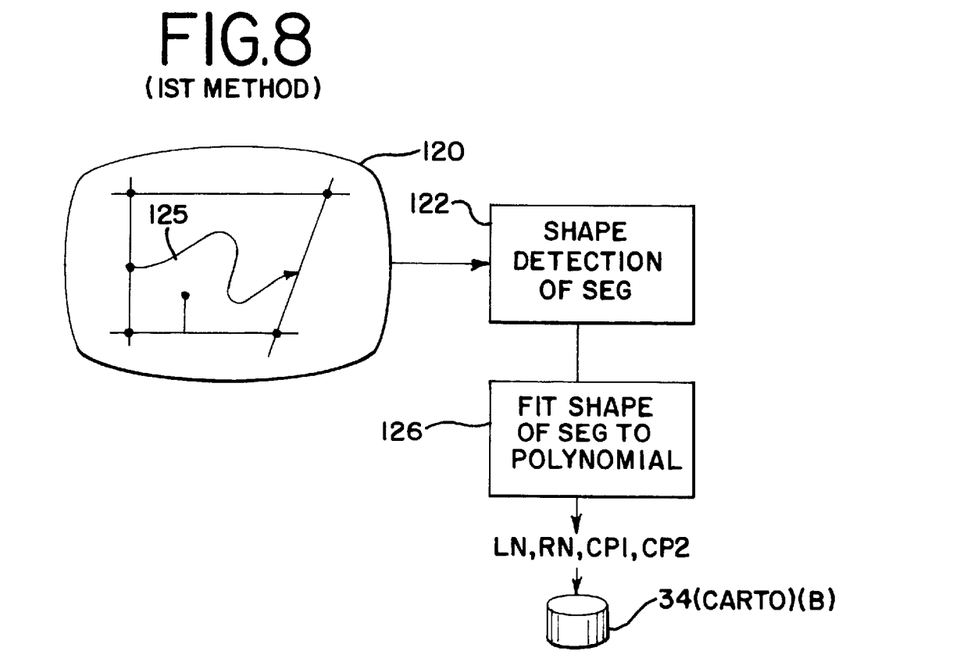
FIG. 8 is a diagram illustrating a first process for forming a geographic database with control points as represented in FIG. 6.

Method for storing shape information according to first embodiment. FIG. 8 demonstrates a first method for generating a geographic database including the control point data for representing other-than-straight features, as shown in FIG. 6. An image 120 of a portion of a geographic region is obtained. The image 120 can be obtained from an aerial photograph, GPS data, paper maps, or other known sources for producing electronic geographic databases. Alternatively, the image 120 can be obtained from a map display program that generates the image 120 from shape point data according to the prior art method described in connection with FIGS. 2 and 3. In FIG. 8, the image 120 is displayed on a computer display screen, but in an implementation of this process it is not necessary to physically show this image on a display screen.

A shape detection program 122 automatically detects the images of the geographic features, such as roadways 125, from the image 120 of the area. This is accomplished using conventional pattern recognition techniques. These pattern recognition techniques may include, for example, identifying contrasting color patterns, continuous shapes, sizes, interconnections, and so on. Using conventional pattern recognition techniques, features such as roadways, including other-than-straight roadways, are automatically detected from the image 120. After the roadways 125 are detected, the program executes a curve fitting program 126 that matches the detected other-than-straight roads to Bezier curves. Curve-fitting techniques are also known in the art. Once a Bezier curve is identified that matches the other-than-straight roadway, the control points used to generate the Bezier curve are identified. The coordinates of the control points are then associated with a segment data entity record that represents the detected road segment. In one embodiment, a user-operator reviews the roadway detection, curve-fitting, and Bezier curve generation steps. This review can be conducted by overlaying an image of the other-than-straight road segment, generated from the Bezier curve control points, over the image 120 to see how well they match. If they fail to match, the user-operator then may use another technique to generate the control points. However, if the detected road segment matches the image of the road segment on the display, the user-operator allows the computer-generated Bezier control points and the detected node/end points, LN, RN, CP1, CP2, to be stored in a cartographic data set 34(carto)(B).

Figure 9:
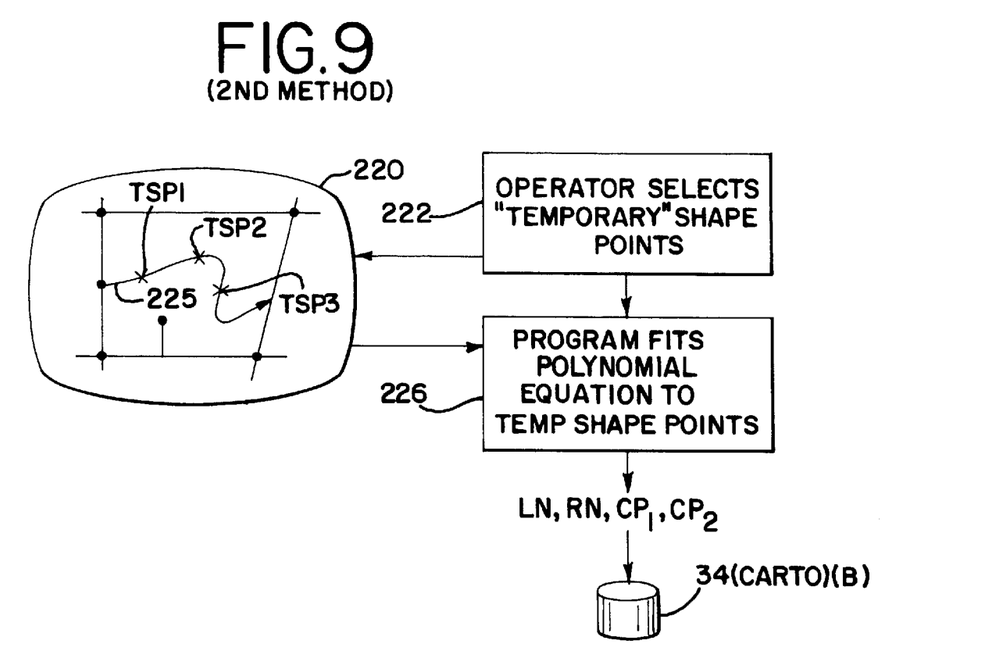
FIG. 9 is a diagram illustrating another process for forming a geographic database with control point as represented in FIG. 6.

Alternate method for storing shape information. FIG. 9 demonstrates an alternative method for fitting a Bezier curve to a given geographic feature. As in the previously described method, an image 220 of a portion of a geographic region is obtained. The image 220 can be an aerial photograph or obtained from an aerial photograph. Alternatively, the image 220 can be obtained from a map display program that generates the image 220 from shape point data according to the prior art method described in connection with FIGS. 2 and 3. The image 22 may printed on paper or may be portrayed on a computer display device. Utilizing this method, a human user-operator, viewing the image,uses a pointing device, such as a digitizing tablet or a mouse, to select points (e.g. by clicking) on the features portrayed in the image which will be represented by data entities in the geographic database. For example, the human user-operator may use the pointing device to select the end points of features to be represented by segment entities by using the pointing device to click on points at the image which represent the ends of the portions of roadway to be represented by segment data entities. If the identified segment is other-than-straight, the user-operator then selects temporary shape points, TSP1, TSP2 . . . TSPn, along the length of the image of the road portion. The user-operator selects these temporary shape points by moving a cursor onto the image of the road segment and clicking with a pointing device (Step 222). Using the temporary shape points, the computer program then generates a curve through them (Step 226). (In an embodiment in which the image 220 is generated from a cartographic data set that already has the end point nodes and shape points identified, the above steps may be omitted.)

The program than executes a curve fitting program 226 that matches the detected other-than-straight roadway portions represented by the selected end points and shape points-to Bezier curves. As mentioned above, curve-fitting techniques are also known in the art. Once a Bezier curve is identified that matches the other-than-straight roadway 225, the control points used to generate the Bezier curve are identified. The coordinates of the control points are then associated with the segment data entity record that represents the selected road segment. To confirm that the generated Bezier curve properly represents the image of the roadway 225, an image of the other-than-straight road segment generated from the Bezier curve control points may be overlaid on the image 220 to see how well they match. The user-operator views the overlaid image and judges whether the Bezier curve generated road image matches the provided road portion 225 within given tolerances. If they fail to match, the user-operator may select additional temporary shape points and the Bezier curve is regenerated. This process is repeated until a curve is generated that adequately fits the image of the road portion. Then, the control point data and the node data, LN, RN, CP1, and CP2, for the best-fit curve are stored, as described above, in the cartographic data set 34(carto)(B). In alternative embodiments, a computer program may be used to determine how well the generated Bezier curve matches the image of the roadway portion being represented. The computer program may use conventional fitting techniques to determine when a threshold representing a satisfactory fit is obtained.

II. Second Embodiment

Another property of Bezier curves is that if the two end points of the curve are fixed at normalized positions, variations in the shape of the curve are determined solely by the relative positions of the control points, (i.e. the shape is "normalized"). Thus, a library of common curve shapes is defined in the form of a table of control point position pairs relative to two standard end point positions. This library is stored in a normalized shape array. By known mathematical operations, these library curve shapes are scaled, rotated and translated in space to place them wherever desired on a map display. In the embodiment of the geographic database, an index reference value into the normalized shape array is associated with each other-than-straight road segment data entity. This index reference value is then used in place-of the actual control point coordinate locations.

For a particular roadway portion, the two end point locations are supplied by the particular curved road segment data entity's associated node data. The control points for a particular shape of Bezier curve are stored in the normalized shape array. An index reference value corresponding to a particular roadway portion's shape in the indexed shape array entity is stored in the road segment data entity. This information is used by the map display application program (or subprogram) to reproduce the curved roadway portion on the display device by mathematically converting the end point and control point information into a Bezier curve which represents the curved roadway portion.

Figure 10:
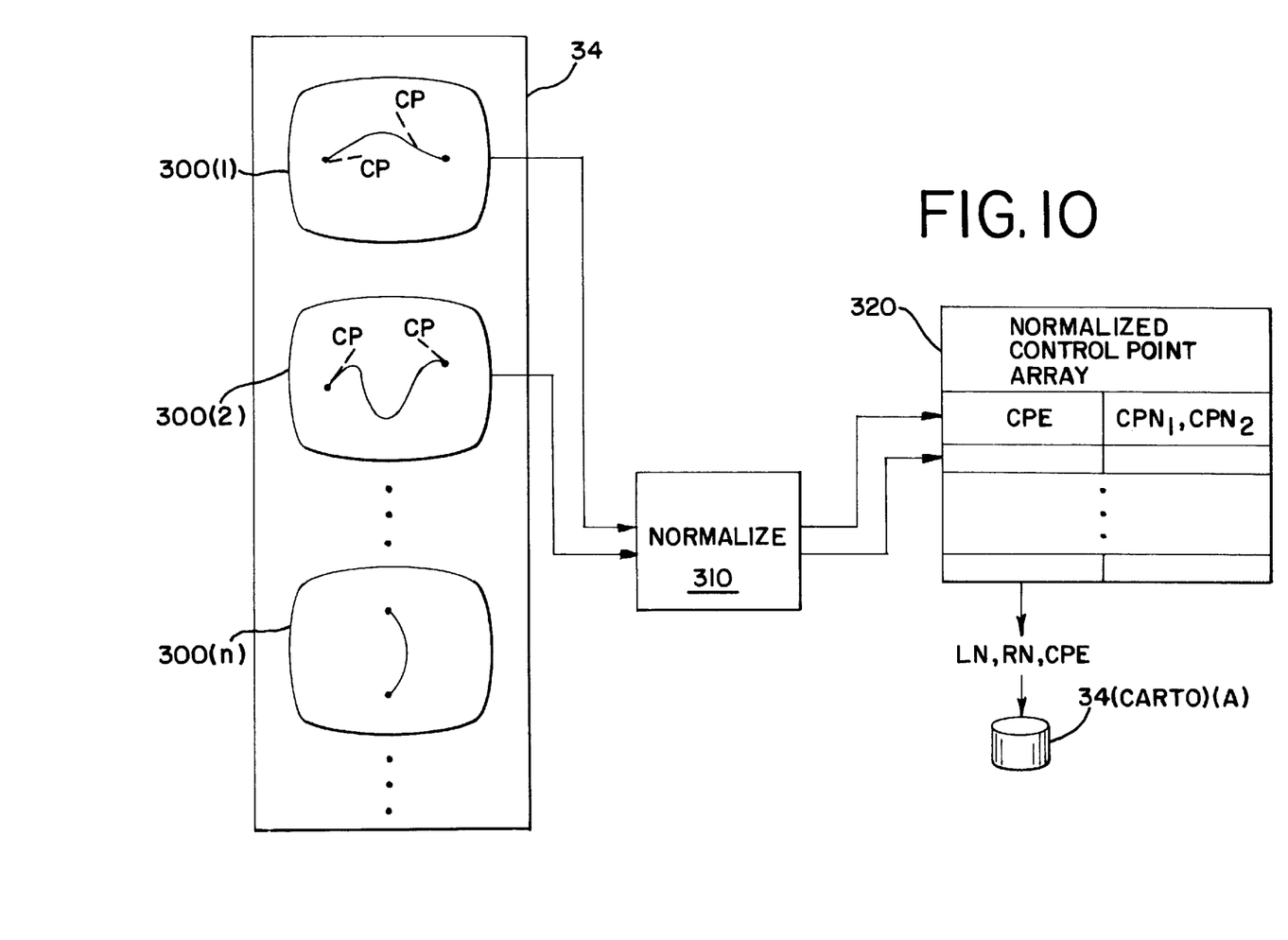
FIG. 10 is a diagram illustrating a third process for forming a geographic database with a normalized table of control point.

Making the Geographic Database with a Normalized Shape Array. An exemplary method of creating this embodiment of the geographic database is illustrated in FIG. 10. Using known techniques, images of all other-than-straight road portions in a geographic region are obtained. These images may be obtained from aerial photographs or satellite images, whether in printed or electronic form, or the images may be obtained from existing geographic databases that include shape point data to represent other-than-straight portions of roads. In FIG. 10, a plurality 300(1), 300(2) ... 300(n) of such images are shown. Next, the nodes of each other-than straight road segment are selected. If the images are generated from an existing geographic database, the node data may be already included in the road segment data entity used to generate the image. Otherwise, the end point/nodes are identified using the techniques described above or that are known in the art.

For roadway portions which are curved, the image of the curved roadway is normalized (Step 310) so as to place the end point positions of each other-than-straight road portion in standardized locations. The normalization process 310 may require that the curved roadway be scaled, rotated and/or translated. Once the curved roadway is normalized, standard mathematical techniques for Bezier curve fitting are employed to find a Bezier curve which best approximates ("best fits") the curved roadway segment. Once a best-fit curve is determined, the two control point positions which define the curve are identified. The coordinates of these control points are normalized relative to the end points and furthermore are normalized by scaling in the dimension perpendicular to the line through the end points so that the separation along that dimension of the control points is standard. Given the standardized end point positions of the curve, the two control point positions are all that are needed to define the curve's shape. Data identifying this control point pair are entered into a normalized shape array 320. The normalized shape array 320 is a data structure that can store a plurality of items of data. In the normalized shape array 320, each separate normalized control point pair, CPN1, CPN2, is associated with a separate shape identifier, CPE. A segment data entity representing the curved road portion uses the index, CPE, instead of the coordinate positions of the control points. The segment data entity, including data corresponding to the nodes, LN, RN, and the index reference value, CPE, is stored in the cartographic data set 34(carto)(A).

Subsequent curved road portions in the geographic data set are examined and processed in a similar manner. As the curved road portions in the geographic data set are examined, some road portions may have the same normalized control point pairs as previously examined road portions. For example, in FIG. 10, the image 300(n) shows a road segment which, after rotation or other normalization, has the same shape as the road segment depicted in the first image 300(1). When the normalized control points are determined for the road segment in the image 300(n), they will match those already in the array 320 which were generated for the road segment in the image 300(1). Then, when the segment data entity record representing the roadway segment shown in the image 300(n) is stored in the data set 34(carto)(A), the record includes, in addition to data identifying the nodes, LN(n), RN(n), an entry CPE(1) to the same normalized control point pair CP1(1), CP2(1), as the roadway depicted in the image 300(1). In this instance, a new entry of control point pairs is not made into the normalized shape array 320.

As each curved road segment is examined, if there is no match in the array 320 for a particular control point position pair, a new entry is added to the array and the new index reference value is stored in the road segment data entity's shape data attribute for this particular roadway portion. However, if the normalized control point pair matches an existing entry in the array 320, a new entry is not made. The process is repeated until all roadway portions are converted into road segment data entities and corresponding node and shape data attributes.

In developing the normalized array, it is preferred to keep track of the number of times each of the control point pairs are used to substitute for the shape points of a segment data entity. Then, once all the road segment data in a region are examined, the index is built only of those pairs which are used the greatest number of times. For example, the array may include only the 2000 most frequently used normalized control point pairs. Within the array, the control point pairs may be ordered by frequency or other means, to speed searching. If a normalized control point pair is not among the control point pairs that wind up in the array, the control points may be stored without being normalized or the data may be stored as shape point data instead of control point data.

In an exemplary implementation of the geographic data set 34(carto)(A), two control points can be stored in as little as 6 bytes of data. A library of two thousand such shapes can be stored in a normalized shape array table occupying just 12 thousand bytes of memory, and accessed with index values having a data size of 1.5 bytes. If these two thousand line shapes recur with relatively high frequency in the database, significant amounts of media space are saved since the shape information for each of those occurrences can be encoded on the media in just 1.5 bytes rather than the 6 bytes taken up by the two Bezier control points (plus the space required for the end points).

In an alternative embodiment, a fixed geographic location grid is used to overlay the images of the curved road portions. This restricts the possible positions that control point pairs and roadway portion end points occupy resulting in a defined number of possible/pre-defined curve shapes that can be created or represented. Prior to beginning the conversion process, a computer calculates all possible control point positions relative to normalized end point positions and renders all possible curve shapes, given a desired level of resolution. These curve shapes are then all initially stored in the normalized shape array, such as the array 320 above. Once the curve fitting/control point determination process is complete for a particular roadway portion, the resultant control point position pair is compared with entries in the normalized shape array. The entry in the table which most closely approximates the calculated control point positions within a pre-defined threshold value is selected. The corresponding index value for that entry is then associated with the road segment data entity that represents the roadway portion. This process is repeated until all the roadway portions in the particular geographic area have undergone conversion.

Figure 11:
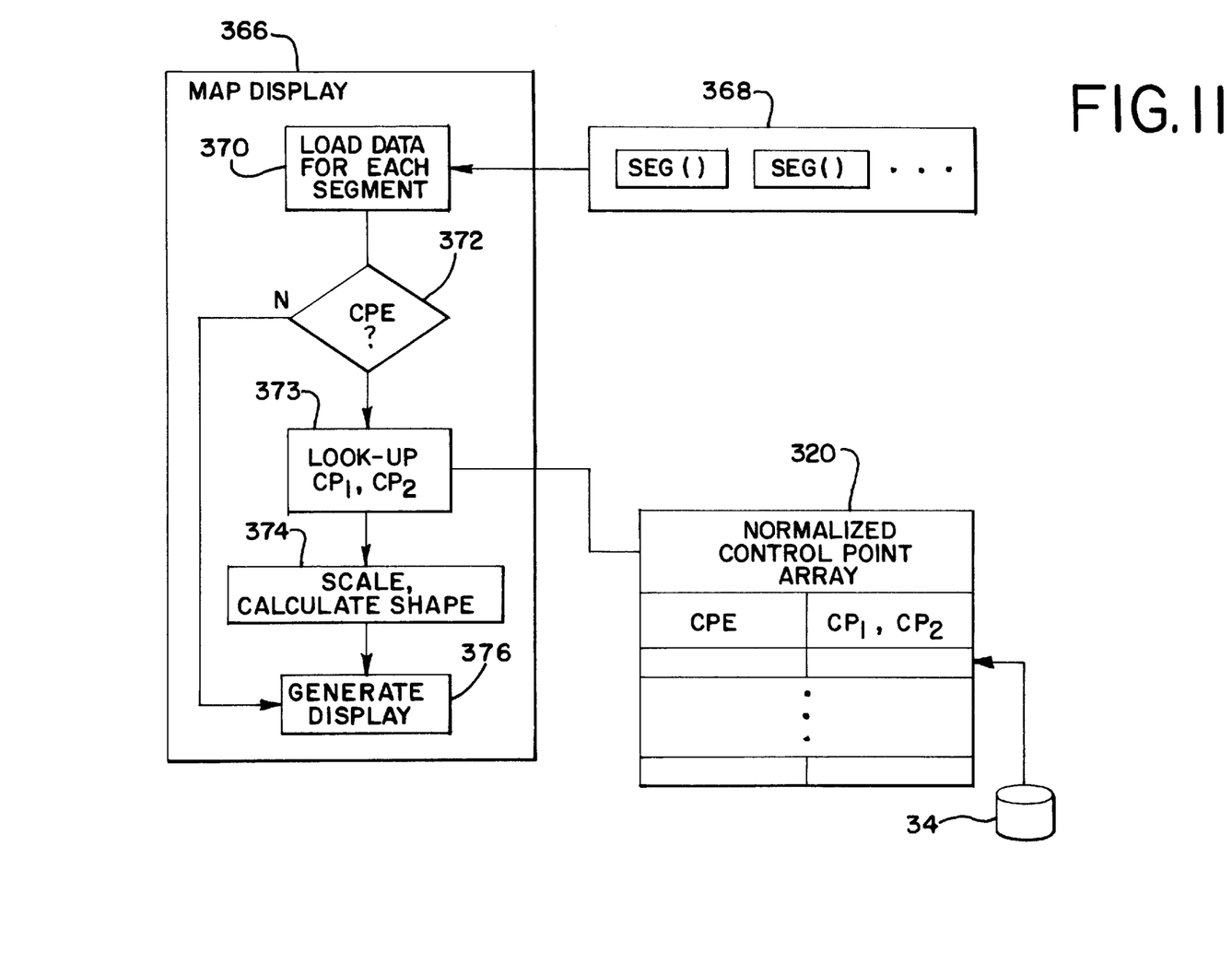
FIG. 11 is a block diagram similar to FIG. 7 illustrating a display portion of the navigation application program modified to use a geographic database formed by the process of FIG. 10.

Using the Second Embodiment of the Geographic Database. As shown in FIG. 11, a map display application program (or subprogram) 366 uses the node data and the index to a normalized shape array in the data entities that represent road segments to reproduce images of the road portions on a display device. In FIG. 11, a list 368 of segment entities, seg( ), is input to the map display program 366. The list identifies the segment data entities which represent portions of roadway to be displayed. The road segment data entities contain the data portraying both straight and curving portions of the roadways in the geographic area to be displayed. The map display application program 366 represents roadway portions on the display device by first reading the data associated with each of the road segment data entities contained in the list 368 (Step 370). If no control point index reference exists for the given road segment data entity (Step 372), the map display application program 366 skips to Step 376 and render a straight line on the display 40 between the locations identified as end points (i.e. the nodes) of the segment data entity. For segments that have control point index references (Step 372), the map display application program 366 proceeds to Step 373. This index reference value is an index into the normalized shape array 320. To enhance operation, the normalized shape array 320 is loaded into memory at initialization of the navigation system or when the map display function is called. Using the index reference value, the map display application program (or subprogram) 366 looks up the entry in the normalized shape array entity 320 which contains the control point position pair data (Step 373). This control point position data, in conjunction with standardized end point positions, and scale factor in the dimension perpendicular to the line through the ends, are used to calculate parametric equations for the Bezier curve (Step 374) which can be used to render the curved roadway portion on the display device by well-known techniques (Step 376). This process repeats for each roadway portion that is to be rendered by the map display application program (or subprogram) 366 on the display device.

III. Alternative Embodiments

In the embodiments described above, each other-than-straight geographic feature was represented by data identifying the coordinates of the end points and data identifying the coordinates of two additional points, i.e. the two control points, used to generate the Bezier curve. It is noted that some other-than-straight geographic features may be generated by more than one Bezier curve. It is further noted that more than two control points, or other parameters, may be associated with the data entity representing the other-than-straight geographic feature.

In alternative embodiments, other kinds of computable functions, other than the Bezier curve function, can be used. These other kinds of computable functions include polynomial equations of any order whose coefficients are used to define the shape of the represented geographic feature. Spline curve functions may be used. In further alternative embodiments, any other kind of computable function can be used to generate a curve to match and represent the other-than-straight geographic feature including fractal functions, or other iterative functions or recursively defined functions.

In the embodiments described above, the data representing the other-than-straight geographic feature was used to portray the feature on a computer display for the user of the navigation system to see. It is understood that the representation of other-than-straight geographic features has other uses in addition to map display. For example, another important function provided by a navigation system is vehicle positioning. In vehicle positioning, the navigation system uses a positioning system, such a GPS system, to-determine one's physical geographic coordinates (e.g. latitude and longitude) and then matches those coordinates to the coordinates of the roadway features represented in the geographic database to inform the user of his or her position on the roadway network in a geographic area. The ability of the disclosed embodiments to determine the shape of other-than-straight geographic features with relative accuracy enables the navigation system to match the user's physical geographic coordinates to the coordinates of the roadway network and provide the user with information that identifies the user's position relative to the roadway network.

Although the use of control points to represent other-than-straight geographic features generally results in decreased storage requirements, under some circumstances, it is possible that the shape of a particular geographic feature may be represented more efficiently using shape points instead of control points. To account for such geographic features, a single geographic database may represent some other-than-straight geographic features using control points and represent other other-than-straight geographic features using shape points. In one embodiment of such a geographic database, each data entity which represents an other-than-straight geographic feature uses either shape points or control points (but not both) to represent the other-than-straight shape of the feature. Each data entity which represents an other-than-straight geographic feature would also include a means to identify to the navigation application using the geographic database whether control points or shape points were being used. The means by which it can be indicated whether control points or shape points were used in a particular data entity may be any technique, such as use of a control bit, use of different ranges of values, different ordering of data, and so on.

In a further embodiment of a geographic database, certain other-than-straight geographic features may be represented most efficiently using both control points and shape points together in a single data entity used to represent the geographic feature. As mentioned above, a means is provided to distinguish whether the shape of the other-than-straight geographic feature is represented by control point data or shape point data. These means can be extended to further indicate that both shape point data and control point data are being used within a single data entity. In an implementation in which both control points and shape points are used, the navigation application may use the control point data to generate a close approximation of the represented geographic feature. Then, shape points are used to fine tune the representation at positions where the control point generated curve does not exactly match the represented feature. In another example, control points may be used to represent a first portion of a roadway segment and shape points may be used to represent another portion of a roadway segment.

It is intended that the foregoing detailed description be regarded as illustrative rather than limiting and that it is understood that the following claims including all equivalents are intended to define the scope of the invention.

We claim:

1. A geographic database embodied in a computer readable medium wherein the geographic database includes data representing curving geographic features, said geographic database comprising:
   a table containing parameters of a computable function; and
   a plurality of data entities that represent geographic features, wherein each of said data entities that represents a curving geographic feature includes
      data representing positions of end points of the represented curving geographic feature, and
      data representing a curving shape of said represented geographic feature between said end points thereof,
   wherein said data representing said curving shape of said represented geographic feature comprises a reference to parameters in said table.

2. The geographic database of claim 1 wherein said computer readable medium is installed in a navigation system.

3. The geographic database of claim 1 wherein the computable function is a Bezier curve.

4. The geographic database of claim 1 wherein the computable function is a Bezier curve and the parameters represent control points.

5. The geographic database of claim 1 wherein the computable function is a polynomial function and the parameters represent coefficients of said polynomial function.

6. The geographic database of claim 1 wherein said plurality of data entities that represent geographic features represent roads.

7. The geographic database of claim 1 wherein said geographic features represented by said plurality of data entities comprise one of: ponds, railroad tracks, buildings, airports, stadiums, parks, mountain ranges, docks, ferries, tunnels, and bridges.

8. The geographic database of claim 1 wherein said geographic features represented by said plurality of data entities have shapes in the form of one of: lines and polygons.

9. The geographic database of claim 1 wherein said parameters in said table are normalized.

10. The geographic database of claim 1 wherein said parameters in said table are normalized relative to end points of the represented curving geographic feature being represented.

11. The geographic database of claim 1 wherein said parameters in said table are normalized relative to end points of the represented curving geographic feature being represented, wherein normalization includes one of scaling, rotating, and translating.

12. A computer program used with a geographic database, the computer program comprising:
   first computer code means that accesses data representing other than straight geographic features in said geographic database, wherein said data representing other than straight geographic features includes normalized parameters that represent other than straight shapes of represented geographic features;
   second computer code means for adjusting said normalized parameters by one of scaling, rotating, and translating; and
   third computer code means for calculating a curve to represent said other than straight geographic features using said adjusted normalized parameters.

13. The computer program of claim 12 further comprising:
   fourth computer code means for generating an image of said curve on a computer display.

14. The computer program of claim 12 further comprising:
   fourth computer code means for determining a position of a vehicle wherein geographic coordinates of said vehicle are matched to said curve.

15. The computer program of claim 12 wherein said first computer code means further comprises:
   computer code means that accesses references in said data representing said other than straight geographic features and then uses said references to access said normalized parameters from a table stored with said geographic database.

16. The computer program of claim 12 wherein said normalized parameters are normalized relative to end points of the other than straight geographic features associated therewith.

17. The computer program of claim 12 wherein said other than straight geographic features include roads.

18. The invention of claim 12 wherein said normalized parameters represent Bezier curve control points and wherein said third computer code means calculates a Bezier curve using said Bezier curve control points.

19. A data arrangement used in a geographic database stored on a computer readable medium and used to represent curved geographic features, the data arrangement comprising:
   a table containing a plurality of entries, wherein each entry in said table includes coefficients that define a shape between two points using a computable function, and wherein said coefficients are normalized relative to said two points; and
   a plurality of data entities that represent separate portions of linearly extending geographic features,
   wherein each of said plurality of data entities includes data identifying end points of that separate portion of a linearly extending geographic feature represented thereby,
   and wherein each data entity of said plurality of data entities that represents a portion of a linearly extending geographic feature that is curved includes a reference to an entry in said table, wherein said referenced entry contains parameters that define the shape of the portion of the linearly extending geographic feature represented thereby using the computable function when the two points to which the parameters in the referenced entry are normalized with respect to the end points identified by the data entity from which the reference was made.

20. The invention of claim 19 wherein said computable function is a Bezier curve.

* * * * *